(12) United States Patent
Seok et al.

(10) Patent No.: US 12,395,461 B2
(45) Date of Patent: *Aug. 19, 2025

(54) CREATION OF CONTENT RESOURCES FOR MESSAGING IN A SOFTWARE AS A SERVICE PLATFORM

(71) Applicant: Twilio Inc, San Francisco, CA (US)

(72) Inventors: Haesun Seok, San Francisco, CA (US); Rebecca Lynn Gebhard, Denver, CO (US); Otávio Dalarossa, San Jose, CA (US); Saurabh Daftary, Walnut Creek, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/771,961

(22) Filed: Jul. 12, 2024

(65) Prior Publication Data

US 2024/0372825 A1 Nov. 7, 2024

Related U.S. Application Data

(63) Continuation of application No. 18/126,294, filed on Mar. 24, 2023, now Pat. No. 12,063,196, which is a continuation of application No. 17/693,137, filed on Mar. 11, 2022, now Pat. No. 11,616,752.

(51) Int. Cl.
| | |
|---|---|
| *H04L 51/56* | (2022.01) |
| *H04L 51/046* | (2022.01) |
| *H04L 51/10* | (2022.01) |
| *H04W 4/14* | (2009.01) |

(52) U.S. Cl.
CPC ............ *H04L 51/56* (2022.05); *H04L 51/046* (2013.01); *H04L 51/10* (2013.01); *H04W 4/14* (2013.01)

(58) Field of Classification Search
CPC ....... H04L 51/56; H04L 51/046; H04L 51/10; H04L 51/066; H04W 4/14; H04W 4/12
See application file for complete search history.

(56) References Cited

U.S. PATENT DOCUMENTS

| | | |
|---|---|---|
| 6,704,785 B1 | 3/2004 | Koo et al. |
| 8,428,228 B1 | 4/2013 | Baxter, Jr. |
| 9,154,456 B2 | 10/2015 | Molina et al. |
| 9,288,165 B1 | 3/2016 | Stovall |
| 9,525,600 B1 | 12/2016 | Shen |
| 9,929,994 B2 | 3/2018 | Hamlin et al. |
| 9,948,583 B2 | 4/2018 | Smullen et al. |
| 10,080,113 B1 | 9/2018 | Guan et al. |

(Continued)

OTHER PUBLICATIONS

International Search Report and Written Opinion for International Application No. PCT/US2023/014799, mailed Jun. 28, 2023, 15 Pages.

*Primary Examiner* — Benjamin M Thieu
(74) *Attorney, Agent, or Firm* — Lowenstein Sandler LLP

(57) ABSTRACT

A first request to create a content template for messages to be sent via a plurality of communications channels via a software-as-a-service (SaaS) platform is received via a first application programming interface (API) call. The first request specifies an order of content types identifying a first content type and at least one alternative content type that is to be included in a message sent to a communication channel among the communication channels if the first content type is not permitted by the communication channel. The content template that is associated with the order of content types is created. The content template is stored at the SaaS platform.

20 Claims, 12 Drawing Sheets

(56) References Cited

U.S. PATENT DOCUMENTS

| | | |
|---|---|---|
| 10,129,211 B2 | 11/2018 | Heath |
| 10,686,899 B2 | 6/2020 | Samaranayake et al. |
| 11,140,105 B2 | 10/2021 | Stafford et al. |
| 11,265,276 B2 | 3/2022 | Wetherell et al. |
| 11,272,325 B2 | 3/2022 | Malatack et al. |
| 11,281,358 B2 | 3/2022 | Li |
| 11,411,930 B1 | 8/2022 | Bernier et al. |
| 11,553,314 B2 | 1/2023 | Stafford et al. |
| 11,558,320 B2 | 1/2023 | Stafford et al. |
| 2009/0327428 A1 | 12/2009 | Ramanathan et al. |
| 2012/0254902 A1 | 10/2012 | Brown et al. |
| 2013/0139148 A1 | 5/2013 | Berg et al. |
| 2013/0212191 A1 | 8/2013 | Suraj et al. |
| 2014/0074952 A1 | 3/2014 | White et al. |
| 2015/0026477 A1 | 1/2015 | Malatack et al. |
| 2015/0131444 A1 | 5/2015 | Malatack et al. |
| 2015/0135300 A1 | 5/2015 | Ford |
| 2017/0041296 A1 | 2/2017 | Ford et al. |
| 2018/0367506 A1 | 12/2018 | Ford et al. |
| 2019/0005534 A1 | 1/2019 | Cummings et al. |
| 2020/0274900 A1 | 8/2020 | Vaishnavi |
| 2021/0250414 A1 | 8/2021 | Arribalzaga et al. |
| 2021/0271682 A1 | 9/2021 | Decker et al. |
| 2021/0306288 A1 | 9/2021 | Boyd et al. |
| 2022/0043980 A1 | 2/2022 | McNeil et al. |
| 2022/0108262 A1 | 4/2022 | Cella et al. |
| 2022/0198779 A1 | 6/2022 | Saraee et al. |
| 2022/0217445 A1 | 7/2022 | Nolan et al. |
| 2023/0237062 A1 | 7/2023 | Decker et al. |

```
curl -X POST https://content.company.com/v1.0.0/Content \
-H 'Content-Type: application/json' \
-u $COMPANY_ACCOUNT_SID:$COMPANY_AUTH_TOKEN \
{
   "friendlyName": "appointment next day reminder",
   "language": "en", // example of parameter : argument
   "variables": {"name": "there"} // default substitution value for the variable
   "types": {
      "company/buttons": {
         "body": "Hey {{name}}! We look forward to seeing you tomorrow for your appointment at {{time}}.
                  Tap to Proceed", // dynamic variables (e.g., {{}}) allow you to customize the message with
                  dynamic values
         "actions": [{
            "type": "REPLY",
            "title": "Cancel"
         },
         {
            "type": "REPLY",
            "title": "Confirm"
         }
         ]
      },
      "company/text": {
         "body": "Hey {{name}}!We look forward to seeing you tomorrow for your appointment at {{time}}.
                  Txt 9 to cancel, 3 to confirm." // less rich content fallback option
      }}}
```

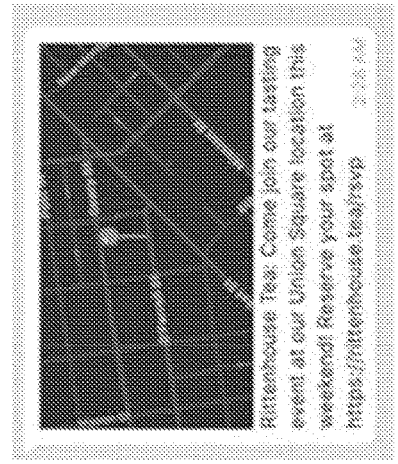
Content Type C (Location Type)
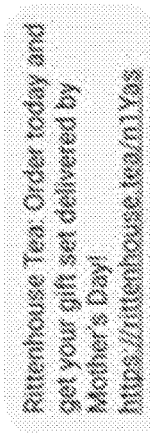
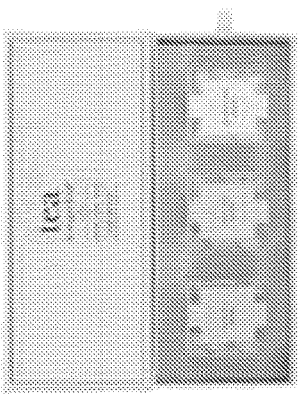
Content Type B (Media Type)
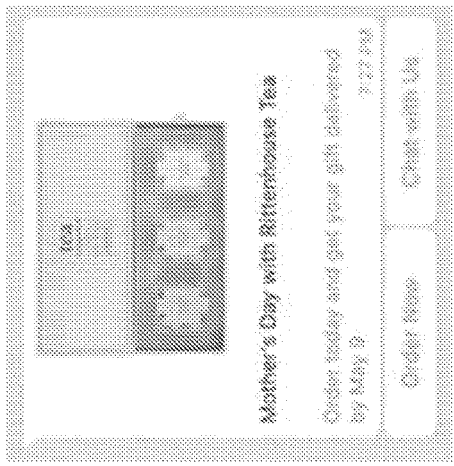
Content Type E (Card Type)
FIG. 3B
Content Type A (Text Type)
Content Type D (Button Type)

```
curl -X POST https://api.company.com/2010-04-01/Messages \
-u $COMPANY_ACCOUNT_SID:$COMPANY_AUTH_TOKEN \
{
  "to": "+13236937449",
  "messagingServiceSid": {messagingServiceSid},
  "contentSid": {contentSid},
  "variables": {"name": "Julie", "time": "4:30PM"}
}
```

312 — "to": "+13236937449"
314 — "messagingServiceSid": {messagingServiceSid}
316 — "contentSid": {contentSid}
318 — "variables": {"name": "Julie", "time": "4:30PM"}

330

```
curl -X POST https://api.company.com/2010-04-01/Messages \
-u $COMPANY_ACCOUNT_SID:$COMPANY_AUTH_TOKEN \
{
  "messagingServiceSid": {messagingServiceSid},
  "to": "companyapp:+13236937449",
  "contentSid": {contentSid},
  "variables": {"name": "Julie", "time": "4:30PM"}
}
```

320 — "messagingServiceSid": {messagingServiceSid}
322 — "to": "companyapp:+13236937449"
324 — "contentSid": {contentSid}
326 — "variables": {"name": "Julie", "time": "4:30PM"}

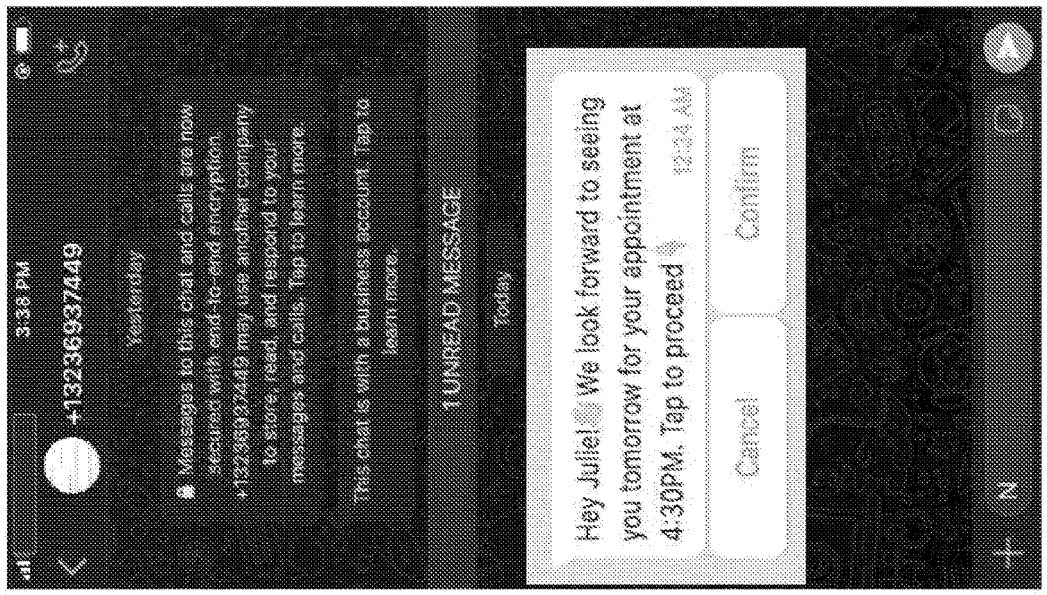
Message B
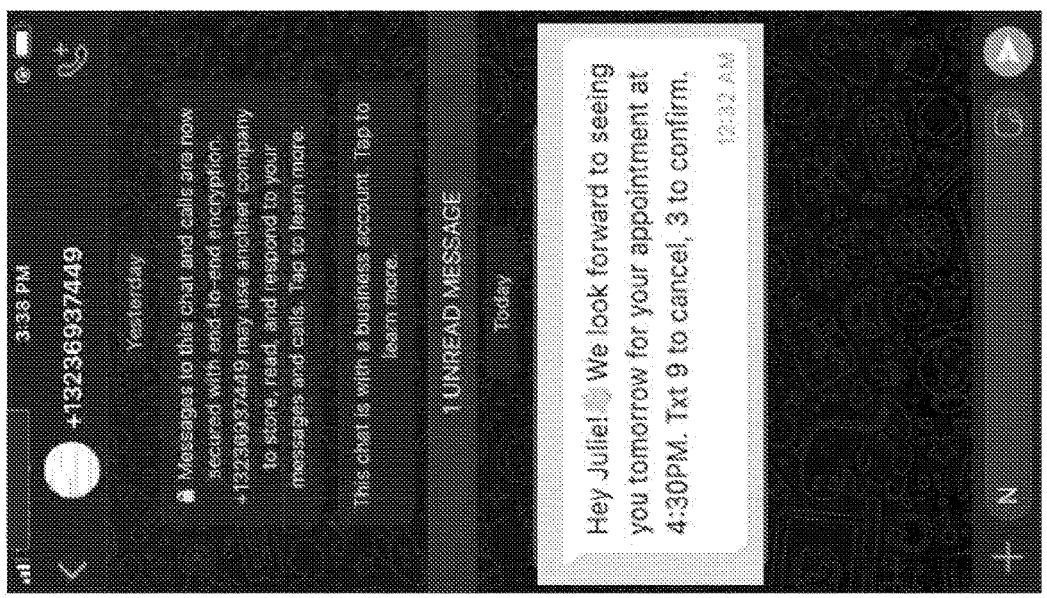
Message A
FIG. 3D

| A | B | C | D | E |
|---|---|---|---|---|
| Ranking of Content Type (lowest to highest) | Channel 1 (SMS) | Channel 2 (MMS) | Channel 3 (IM application A) | Channel 4 (IM application B) |
| Text type | yes | yes | yes | yes |
| Media type | no | yes | yes | yes |
| Location Type | no | no | yes | no |
| Button Type | no | no | yes | yes |
| List-Picker Type | no | no | yes | no |
| Card Type | no | no | yes (without media) | yes (without media) |

430

408
Receive a request to verify that the message content can be sent using a communication channel of the multiple communication channels 410
Translating at least a part of the content resource in the first format into a second format that corresponds with the specified communication channel 412
Prepare a verification request in the second format that corresponds with the specified communication channel 414
Send the verification request to a third-party platform associated with the specified communication channel 416
Provide a result of the verification indicating whether the message content is approved to be sent using the specified communication channel

Receive a request to define an order of content types

420

Associate the order of content types with the client account

500

502
Receive a request to send a message via a communication channel of multiple communication channels 504
Obtain the content resource based on the identifier 506
Prepare the message based on the request and the content resource 508
Send, via the communication channel, the prepared message to a recipient device

FIG. 5

CREATION OF CONTENT RESOURCES FOR MESSAGING IN A SOFTWARE AS A SERVICE PLATFORM

RELATED APPLICATIONS

The application is a continuation of pending U.S. patent application Ser. No. 18/126,294 filed on Mar. 24, 2023, which is a continuation of U.S. patent application Ser. No. 17/693,137 filed on Mar. 11, 2022, now U.S. Pat. No. 11,616,752, the entire contents of all are hereby incorporated by reference herein in their entirety.

TECHNICAL FIELD

Aspects and embodiments of the disclosure relate to computer networking, and more specifically, to systems and methods for creation of content resources for messaging in a software as a service (SaaS) platform.

BACKGROUND

Instant messaging (IM) technology can include a type of online chat allowing real-time transmission of media content over the Internet or another computer network. Messages are typically transmitted between two or more parties, when each user inputs content and triggers a transmission to the recipient(s), who may be all connected on a common network or common application. Short Messaging Service (SMS) technology can include text messaging. An SMS message is often sent from one mobile device to another over the cellular network. Multimedia Messaging Service (MMS) technology can include a way to send messages that include multimedia content to and from a device, such as a mobile phone, over a cellular network.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

FIG. 3A illustrates an example of a request to create a content resource, in accordance with embodiments of the disclosure.

FIG. 3B illustrates examples of content types, in accordance with some embodiments of the disclosure.

FIG. 3C illustrates examples of message send requests, in accordance with some embodiments of the disclosure.

FIG. 3D illustrates examples of messages sent via communication channels to recipient devices based on message send requests, in accordance with some embodiments of the disclosure.

FIG. 4B depicts a flow diagram of an example method for verifying that message content can be sent using a particular channel associated with a communication services platform, in accordance with some embodiments of the disclosure.

FIG. 5 depicts a flow diagram of an example method for sending messages using a software (SaaS) platform and via multiple communication channels, in accordance with some embodiments of the disclosure.

DETAILED DESCRIPTION

Figure 1:
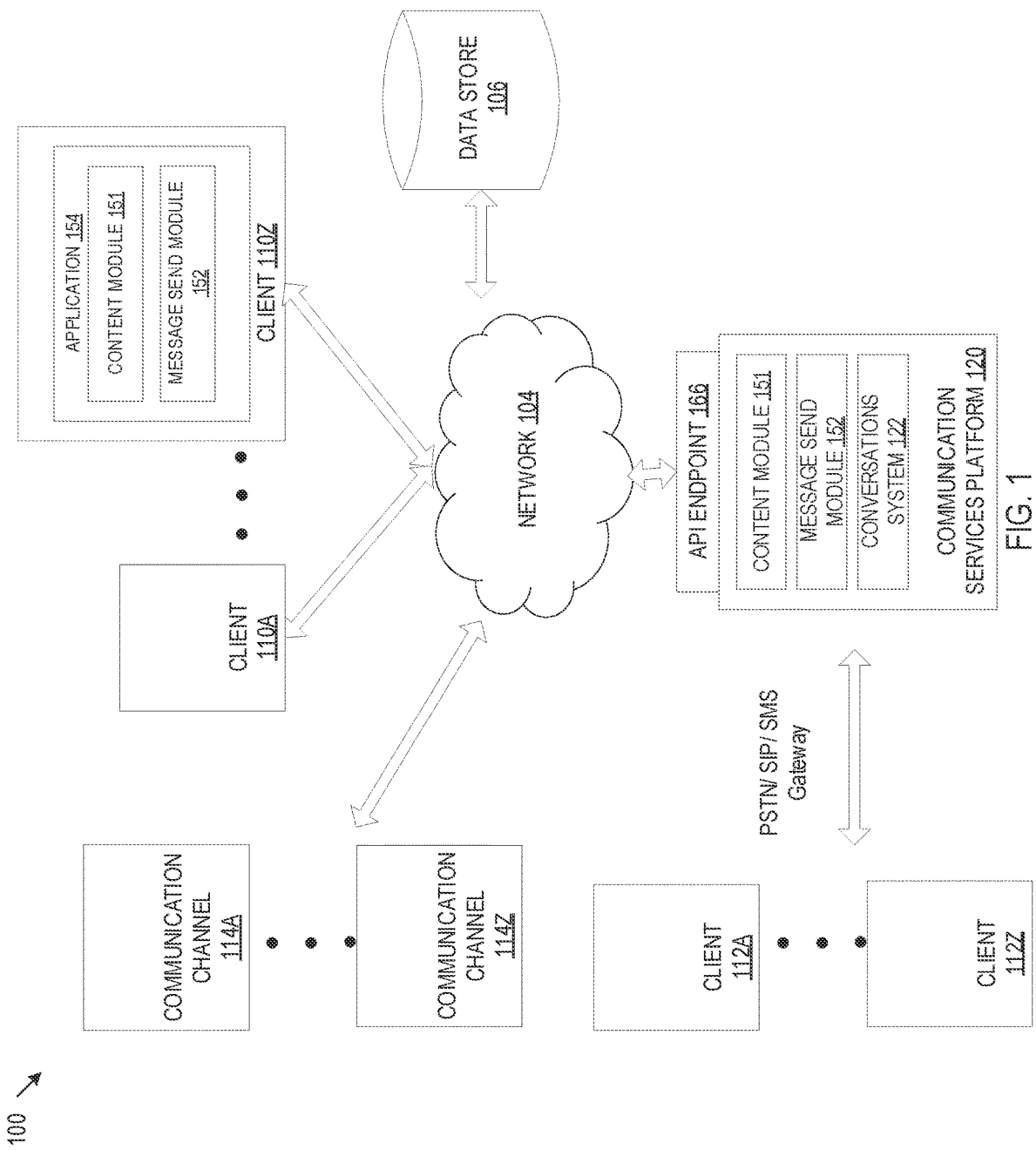
FIG. 1 illustrates an example system architecture, in accordance with some embodiments of the disclosure.

A communication platform, such as a Software as a Service (SaaS) platform, can offer various communication services to users. For example, a SaaS platform can offer users tools that facilitate the sending of messages, such as SMS messages, MMS messages, and/or IM messages, to recipient devices via various communication channels. A communication channel can refer to a form of communication that uses one or more of a particular protocol, a particular underlying technology or is provided by a particular entity (e.g., third party entity). Different communication channels can refer to different forms of communication that can use one or more of different communication protocols, different underlying technologies (e.g., SMS vs IP), or be provided by different entities, such as a third-party entity, that offer services, software or hardware (or a combination thereof) through which messages can be sent to recipient devices. For instance, the SaaS platform may send a text message (e.g., SMS message) to a recipient device using a communication channel, such as a telecommunications carrier network or send an instant message to a recipient device using an IM communication channel (e.g., using an application programming interface (API) to communicate with the IM communication channel). Examples of channels can include Public Switched Telephone Network (PTSN) based channels such as SMS or MMS, Internet Protocol (IP) based channels, voicemail, and proprietary channels (e.g., proprietary social media messaging applications).

With respect to sending messages, each communication channel may implement different rules and/or formats. A format can refer to a format that is specific to a particular programming language, to a markup language, to a particular application, to a standard, and/or to another specification. For instance, a first IM communication channel may receive instructions to send a message to a recipient device via an API call having a first syntax in a first programming language, while a second IM communication may receive instructions to send a message to a recipient device via an API call having a different syntax in the same or different programming language.

Additionally, each communication channel may be configured to send different content types. A content type can refer to a type of content and/or message content that is to be included in a message. In some cases, a single content type can be sent in each message. For example, a SMS communication channel may be configured to send a text content type (e.g., text message) but not configured to send other content types, such a multimedia content type (e.g., MMS message). In another example, a first IM channel may be configured to send a text content type and a multimedia content type but not configured to send other content types, such as a button content type.

Such variability in the formats used and the content types offered between communication channels present challenges to developers in the creation and sending of messages to recipient devices via the various communication channels. These challenges may be compounded due to the rapid development of new communication channels and the proliferation of new and richer content types. For example, developers may need to learn multiple channel specific formats and rules in order to send messages via the various communication channels. To send the same message via different communication channels, a developer may need to create multiple different message send requests, each implementing the specific communication channel format and/or rules.

Additionally, sending messages via one or more communication channels can also be challenging at least because to send multiple messages via a particular channel a developer may have to create message content and send instructions for each instance of the message to be sent, which can create a very inefficient use of resources including network bandwidth resources, storage resources, and computational resources.

Moreover, a developer may need to create message content for a particular channel and send instructions to send a message via the particular channel. In instances where the channel is not available for transmission of the message (e.g., the policy of the channel does not allow for the type of message content or the channel does not support the particular content type), the message send operation may fail resulting in no message being sent and/or an error message being returned to the developer.

Aspects of the disclosure address the above-mentioned and other challenges by creating separate request tools, such as APIs, for content creation (e.g., content resource creation API) and message send (e.g., message send API). The content resource creation API can allow developers the tools to create a single message content resource template (e.g., content resource) that can be used to send multiple messages via multiple communication channels (e.g., SMS, MMS, and IM platforms). Rather than develop code specific to each communication channel, developers can prepare a content resource (e.g., template) using a content resource creation API utilizing a common format (e.g., single format). The content resource can be translated to the various formats corresponding to the multiple communication channels in order to prepare messages (and instructions) having formats that are specific to the individual communication channels.

In some embodiments, a developer can define one or more content objects in a content resource, such that the content object sent to various communication channels can change depending on the subset of content objects that are available for a particular communication channel. Additionally and in some embodiments, a content resource can include dynamic variables (e.g., placeholder variables) that can be defined at message send, which helps enable the content resource's reusability.

In some cases, to send messages a communication channel may require verification of message content prior to a message being sent. For instance, a channel may have a policy prohibiting the sending of certain content and message content can be reviewed prior to being sent to determine whether the message content aligns with the policy. The SaaS platform can perform the verification request at least in part by using the content resource.

The content resource can be saved at the SaaS platform to be used at a later time. Rather than rewriting code for each message sent at each communication channel, a developer can reference the content resource in a message send API call any time a developer desires to send messages via one more communication channels. At message send time, a developer can send messages via various channels with few to no code changes to the content resource. At message send time, the SaaS platform, responsive to the message send API call can retrieve the content resource and translate the common format of the content resource to any of a number of different formats corresponding to the various communication channels. The SaaS platform can also replace dynamic variables referenced in the content resource with values defined in the message send API request. Moreover, the SaaS platform can determine which one of multiple content types defined in a content resource is to be used for a particular communication channel.

In still other embodiments, the SaaS platform can implement one or more fallback content types (e.g., alternative content types) when none of the content types defined in the content resource are available for a specific communication channel. Rather than not sending a message and/or encountering an error, a message can be sent with a fallback content type. For example, if the content resource defines a button content type but a button type is not available for the requested communication channel, the SaaS platform can select the next richest content type that is available for the requested channel-even though the fallback content type may not be defined in the template.

In still other embodiments, developers can define fallback content types, and the SaaS platform can select the fallback content type based on the user-defined fallback types.

As noted, a technical problem addressed by embodiments of the disclosure is creating message content for messages that can be sent to recipient devices via various communication channels that each implement different formats and rules.

Another technical problem addressed by embodiments of the disclosure is sending messages to recipient devices via various communication channels where the message content needs to be rewritten for each message that is sent.

A technical solution to the above identified technical problem may include implementing a content resource creation request tool, such as a content resource creation API that allows the creation of a content resource (e.g., template) that can be written in a common format for translation to different formats corresponding to different communication channels and that can be used to define message content for messages to be sent via multiple communication channels.

Another technical solution to the above identified technical problem includes using separate requests, such as separate APIs, for content resource creation and message send, where the message send request can reference a content resource that specifies message content for messages, thereby allowing the reuse of message content without rewriting message content for each message that is sent.

Thus, the technical effect may include developing the technical tools, such as APIs, that allows for more efficient development of message content creation and more efficient execution of message send. Further, the technical effect may include reducing the amount of resources (e.g., compute resources, storage resources, network bandwidth, etc.) that are used to create message content and send messages to recipient devices via multiple communication channels.

FIG. 1 illustrates an example system architecture 100, in accordance with some embodiments of the disclosure. The system architecture 100 (also referred to as "system" herein) includes a communication services platform 120, a data store 106, client devices 110A-110Z connected to a network 104, client devices 112A-112Z communicatively coupled to communication services platform 120, and communication channels 114A-114Z coupled to the network 104 (or otherwise communicatively coupled to other elements of the system 100).

In embodiments, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some embodiments, data store 106 is a persistent storage that is capable of storing data as well as data structures to tag, organize, and index the data. Data store 106 may be hosted by one or more storage devices, such as main memory, magnetic or optical storage based disks, tapes or hard drives, NAS, SAN, and so forth. In some embodiments, data store 106 may be a network-attached file server, while in other embodiments data store 106 may be some other type of persistent storage such as an object-oriented database, a relational database, and so forth, that may be hosted by communication services platform 120 or one or more different machines coupled to the communication services platform 120 via the network 104.

The client devices 110A-110Z (generally referred to as "client device(s) 110" herein) may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some embodiments, client devices 110 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components. In some embodiments, client devices 110A through 110Z may also be referred to as "user devices."

In some embodiments, a client device, such as client device 110Z, can implement or include one or more applications, such as application 154 (also referred to as "client application 154" herein) executed at client device 110Z. In some embodiments, application 154 can be used to communicate (e.g., send and receive information) with communication services platform 120. In some embodiments, application 154 can implement user interfaces (e.g., graphical user interfaces (GUIs)) that may be webpages rendered by a web browser and displayed on the client device 110Z in a web browser window. In another embodiment, the user interfaces of client application 154 may be included in a stand-alone application downloaded to the client device 110Z and natively running on the client device 110Z (also referred to as a "native application" or "native client application" herein).

In some embodiments, client devices 110 can communicate with communication services platform 120 using one or more function calls, such as application programming interface (API) function calls (also referred to as "API calls" herein). For example, the one or more function calls can be identified in a request using one or more application layer protocols, such a HyperText Transfer Protocol (HTTP) (or HTTP secure (HTTPS)), and that are sent to the communication services platform 120 from the client device 110Z implementing application 154. In some embodiments, the communication services platform 120 can respond to the requests from the client device 110Z by using one or more API responses using an application layer protocol. Similarly, communication services platform 120 can communicate with one or more communication channels 114A-114Z using API function calls.

In some embodiments, one or more of client devices 110 can be identified by a uniform resource identifier (URI), such as a uniform resource locator (URL). For example, communication services platform 120 can send an API call to client device 110Z addressed to a URL specific to the client device 110Z. In some embodiments, the communication services platform 120 can be identified by a URI. For instance, the API call sent by a client device 110 to communication services platform 120 can be directed to the URL of communication services platform 120.

In some embodiments, client devices 112A-112Z (generally referred to as "client device(s) 112" herein) may be similar to client devices 110. In some embodiments, client devices 112 can include one or more telephony devices. A telephony device can include a Public Switched Telephone Network (PSTN)-connected device, such as a landline phone, cellular phone, or satellite phone, for example. In some embodiments, a telephony device can also include an internet addressable voice device (e.g., non-PSTN telephony device), such as Voice-Over-Internet-Protocol (VOIP) phones, or Session Initiation Protocol (SIP) devices, for example. In some embodiments, a telephony device can include one or more messaging devices, such as a Short Message Service (SMS) network device that, for example, uses a cellular service to exchange SMS messages or Multimedia Messaging Service (MMS) messages.

In some embodiments, the communication services platform 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to data or services. Such computing devices may be positioned in a single location or may be distributed among many different geographical locations. For example, communication services platform 120 may include a plurality of computing devices that together may comprise a hosted computing resource, a grid computing resource or any other distributed computing arrangement. In some embodiments, communication services platform 120 may correspond to an elastic computing resource where the allotted capacity of processing, network, storage, or other computing-related resources may vary over time.

In some embodiments, communication services platform 120 provides one or more API endpoints 166 that can expose services, functionality or content of the communication services platform 120 to one or more of client devices 110 or communication channels 114A-114Z. In some embodiments, an API endpoint can be one end of a communication channel, where the other end can be another system, such as a client device 110Z or communication channel 114Z. In some embodiments, the API endpoint can include or be accessed using a resource locator, such a universal resource locator (URL), of a server or service. The API endpoint can receive requests from other systems, and in some cases, return a response with information responsive to the request. In some embodiments, HTTP or HTTPS methods can be used to communicate to and from API endpoint 166.

In some embodiments, the API endpoint 166 (also referred to as a "messaging request interface" herein) can function as a computer interface through which communication requests, such as message requests, are received and/or created. The communication services platform 120 may include one or more types of API endpoints.

In some embodiments, the API endpoint 166 can include a messaging API whereby external entities or systems can send a communication to create message content and/or request sending of a message. The API may be used in programmatically creating message content and/or requesting sending of one or more messages. In some embodiments, the API is implemented in connection with a multitenant communication service wherein different accounts (e.g., authenticated entities) can submit independent requests. These requests made through the API can be managed with consideration of other requests made within an account and/or across multiple accounts on the communication service.

In some embodiments, the API of the API endpoint 166 may be used in initiating general messaging or communication requests. For example, a messaging request may indicate one or more destination endpoints (e.g., recipient phone numbers), message content (e.g., text and/or media content), and possibly an origin endpoint (e.g., a phone number to use as the "sending" phone number).

In some embodiments, the API of the API endpoint 166 may be any suitable type of API such as a REST (Representational State Transfer) API, a GraphQL API, a SOAP (Simple Object Access Protocol) API, and/or any suitable type of API. In some embodiments, the communication services platform 120 can expose through the API, a set of API resources which when addressed may be used for requesting different actions, inspecting state or data, and/or otherwise interacting with the communication platform.

In some embodiments, a REST API and/or another type of API may work according to an application layer request and response model. An application layer request and response model may use HTTP (Hypertext Transfer Protocol), HTTPS (Hypertext Transfer Protocol Secure), SPDY, or any suitable application layer protocol. Herein HTTP-based protocol is described for purposes of illustration rather than limitation. The disclosure should not be interpreted as being limited to the HTTP protocol. HTTP requests (or any suitable request communication) to the communication services platform 120 may observe the principles of a RESTful design or the protocol of the type of API. RESTful is understood in this document to describe a Representational State Transfer architecture. The RESTful HTTP requests may be stateless, thus each message communicated contains all necessary information for processing the request and generating a response. The API service can include various resources, which act as endpoints that can specify requested information or requesting particular actions. The resources can be expressed as URI's or resource paths. The RESTful API resources can additionally be responsive to different types of HTTP methods such as GET, PUT, POST and/or DELETE.

In some embodiments, the API endpoint 166 can include a message request instruction module that can be called within an application, script, or other computer instruction execution. For example, a computing platform may support the execution of a set of program instructions where at least one instruction within a script or other application logic is used in specifying a message request and communicating that request.

In some embodiments, the API endpoint 166 can include a console, administrator interface, or other suitable type of user interface. Such a user-facing interface can be a graphical user interface. Such a user interface may additionally work in connection with a programmatic interface In some embodiments, the message request can include a data object characterizing the properties of a message. In some embodiments, the communication services platform 120 is associated with message requests that are programmatically initiated (e.g., an application-to-person (A2P) message). In some embodiments, the message request could be one initiated from an inbound received message.

In some embodiments, the message request can include one or more of one or more destination endpoints, one or more origin endpoints, and message content. In some embodiments, one or more of these properties may be specified indirectly such as through system or account configuration. For example, all messages may be automatically assigned an origin endpoint that is associated with an account. In some embodiments, the message content can include any suitable type of media content including, text, audio, image data, video data, multimedia, interactive media, data, and/or any suitable type of message content.

In an illustrative example, used for illustration rather than limitation, communication services platform 120 can include a Software as a Service (SaaS) platform that can at least in part provide one or more services, such as communication services, to one or more clients. The SaaS platform may deploy services, such as software applications, to one or more clients for use as an on-demand service. For example, the SaaS platform may deliver and/or license software applications on a subscription basis while also hosting, at least in part, the software application. The licensed software applications can, at least in part, be hosted on the infrastructure, such as the cloud computing resources of the SaaS platform.

In some embodiments, communication services platform 120, as noted above, can provide communication services that include, but are not limited to, voice services, messaging services (e.g., SMS services or MMS services), email services, video services, chat messaging services (e.g., internet-based chat messaging services), or a combination thereof. Communication operations using the communication services can use one or more of a communication network (e.g., Internet), telecommunications network (e.g., such as a cellular network, satellite communication network, or landline communication network), or a combination thereof, to transfer communication data between parties.

In some embodiments, the conversations system 122 can function to interface with one or more communication network(s) and/or service(s) for communication of a conversation (e.g., SMS, MMS, and/or chat messaging). In some embodiments, the conversations system 122 can include an interface to one or more carrier-based communication routes used in sending SMS, MMS, and/or other carrier-based messages. There may be multiple carrier-based communication routes that serve as different optional "routes" when sending communications over a carrier-based network (e.g., a mobile network). The conversations system 122 may additionally or alternatively include an interface to one or more over-the-top (OTT) communication channels which may be offered by a 3rd party messaging platform (e.g., proprietary social media messaging, messaging applications, etc.).

A route can refer to a communication delivery path, defined by a series of one or more of computers, routers, gateways and/or carrier networks through which the communication is transferred from a source computer to a destination computer (e.g., through which the transmission of a message occurs). For example, the same route may be used to transfer messages using different communication channels, and the same communication channel may be used to transfer messages using different routes. In some example embodiments, different channels correspond to different applications on a receiving device. For example, a smart phone may have one application to handle SMS messages, another application to handle email, and a third application to handle voicemail. Alternatively, some applications may handle multiple communication channels. For example, one application may handle both SMS and MMS messages.

In some embodiments, when the conversations system 122 elects to send a message using a carrier-based channel, the message is communicated to an appropriate carrier connection for routing to the destination endpoint. Carrier-based channels can use SMPP (Short Message Peer-to-Peer protocol) for communicating to an aggregator or another suitable gateway such that the SMS/MMS message is transferred over a carrier network. Once transmitted to the carrier network, the message can be relayed appropriately to arrive at the intended destination. A message in transit may have multiple routing segments that are used in the delivery to an end destination device.

For example, the conversations system 122 can include an interface to one or more SMS Gateways that enable a computer to send and receive SMS text messages to and from a SMS capable device over the global telecommunications network (normally to a mobile phone). The SMS Gateway translates the message sent and makes it compatible for delivery over the network to be able to reach the recipient. The different SMS gateways (or more generally message gateways) can serve as different route options when the conversations system 122 is determining a channel and/or route to be used for one or more message transmissions.

In some embodiments, SMS Gateways can route SMS text messages to the telco networks via an SMPP interface that networks expose, either directly or via an aggregator that sells messages to multiple networks. SMPP, or Short Message Peer-to-Peer, is a protocol for exchanging SMS messages between Short Message Service Centers (SMSCs) and/or External Short Messaging Entities (ESMEs).

In some embodiments, the destination of a message may be used in determining the candidate message routes (and/or channels). For example, a phone number of a destination endpoint or another identifier associated with the intended recipient of the message may be used to identify the destination network of the intended recipient. Each destination network may be assigned a Mobile Country Code (MCC)/Mobile Network Code (MNC) pair that identifies the specific destination network In some embodiments, communication services platform 120 includes a conversations system 122 that can use the phone number associated with the intended recipient of the message to lookup the MCC/MCN pair identifying the destination network. For example, the conversations system 122 can determine the MCC/MNC pair using an MCC/MNC directory that lists the MCC/MNC pair corresponding to each phone number. In some embodiments, the MCC/MNC directory may be stored in a routing provider storage. Alternatively, the MCC/MNC directory may be stored at some other network accessible location. In either case, the conversations system 122 can use the phone number associated with the intended recipient of the message to query the MCC/MNC directory and identify the MCC/MNC pair that identify the corresponding destination network.

In some embodiments, the conversations system 122 can use the MCC/MNC pair retrieved from the MCC/MNC directory to identify candidate routing providers and routes that are available to deliver a message to the destination network identified by MCC/MNC pair. For example, the routing provider storage may include a routing provider directory that lists each MCC/MNC pair serviced by the conversations system 122 and the corresponding routing providers and routes available for use with each MCC/MNC pair. That is, the routing provider directory can list the routing providers and routes that are available to the conversations system 122 to deliver messages to the destination network identified by each MCC/MNC pair listed in the routing provider directory.

In some embodiments, communication services platform 120 can include a multitenant system. Multitenancy can refer to a mode of operation of software applications where multiple independent instances of one or multiple applications operate in a shared computer environment. In some embodiments, the instances (tenants) can be logically isolated, but physically integrated. The degree of logical isolation can be complete, but the degree of physical integration can vary. The tenants (application instances) can be representations of organizations that obtain access to the multitenant system. The tenants may also be multiple applications competing for shared underlying resources. Multiple organizations can access the resources of communication services platform 120 without any indication that the resources are shared between the multiple organizations. The data of each of the organizations can be logically isolated from one another such that each organization has access to their own data but not the data of other organizations in the multitenant system. In some embodiments, communication services platform 120 can include a single tenant system.

An organization can be an example of an entity, such as a legal entity, that includes multiple people and that has a particular purpose. A non-limiting example of an organization includes a corporation (e.g., authorized by law to act as a single entity or legal entity). In some embodiments, multiple organizations can include one or more organizations that are independent or distinct from the other organizations. For example, a first organization can be corporation A and a second organization can be corporation B. Corporation A can be considered an independent legal entity from corporation B. Each of corporation A and corporation B can make independent decisions and have a different legal or corporate structure.

In some embodiments, a "user" may be represented as a single individual. However, other embodiments of the disclosure encompass a "user" being an entity controlled by a set of users and/or an automated source. For example, a set of individual users federated as one or more departments in an organization may be considered a "user." In general, functions described in one embodiment as being performed by the communication services platform 120 can also be performed on the client devices 110A through 110Z in other embodiments (and vice versa), if appropriate. In addition, the functionality attributed to a particular component can be performed by different or multiple components operating together. The communication services platform 120 can also be accessed as a service provided to other systems or devices through appropriate APIs.

As noted above and in some embodiments, a communication channel can refer to an entity, such as a third-party entity (e.g., organizations different than communication services platform 120), that offers services, software or hardware (or a combination thereof) through which messages can be sent to recipient devices. (e.g., organizations different from communication services platform 120). A third party can refer to an entity, such as organization or business (e.g., a different legal entity than communication services platform 120) that is distinct from another entity, such as the entity controlling or owning the communication services platform 120. In some embodiments, the communication services offered by communication channels 114A-114Z can be integrated into communication services platform 120. In some embodiments, the communication services offered by communication channels 114A-114Z can include messaging services. In some embodiments, messaging services can include one or more of a short messaging service (SMS) offered by an SMS channel, a multimedia messaging service (MMS) offered by an MMS channel, or an instant messaging service (e.g., chat messaging) offered by an instant messaging service channel. In some embodiments, an instant messaging service is different from an electronic mail (email) service. In some embodiments, the communication channels 114A-114Z can include an email channel. In some embodiments, the communication channels 114A-114Z exclude an email channel.

In some embodiments, email messages can use a standard protocol for sending and receiving email messages. The standard protocol can be used across different platforms. In some embodiments, instant messages can use protocols specific to a platform that may or may not be compatible with other platforms. In some embodiments, instant messaging can differ from email in that conversations over instant messaging can happen in real-time, while conversations over email are not in real-time.

In an illustrative example, a client device 110Z may be sending an instant message using communication channel 114Z. Client device 110Z can send an API call to communication services platform 120 that includes relevant information with respect to the instant message sending request. Communication services platform 120 can translate the API call in a first format (e.g., format that corresponds to or is compatible with communication services platform 120) and prepare a respective API request in a second format (e.g., a format that corresponds to or is compatible with communication channel 114Z). The respective API request in the second format can request communication channel 114Z to send an instant message (via an instant messaging application) that contains the content identified by client device 110Z to a recipient device (e.g., similar to client devices 110A-110Z or client devices 112A-112Z).

In another illustrative example, client device 110Z may want to send an SMS message using communication channel 114A and sends an API call to communication services platform 120 that includes relevant information with respect to the SMS message sending request. Communication services platform 120 can translate the API call in the first format and prepare the message in a second format so that the message in the second format (e.g., text message) can be sent to the recipient device using the communication channel 114A (e.g., telecommunications carrier).

In some embodiments, communication services platform 120 and/or client devices 110 include an instance of content module 151 and/or message send module 152. In some embodiments, content module 151 and/or message send module 152 of client device 110Z can perform one or more aspects of the disclosure.

Although embodiments of the disclosure are discussed in terms of communication service platforms, embodiments may also be generally applied to any type of platform, system or service.

In situations in which the systems discussed here collect personal information about users, or may make use of personal information, the users may be provided with an opportunity to control whether the communication services platform 120 collects user information, or to control whether and/or how to receive content from the communication services platform 120 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the communication services platform 120.

Figure 2:
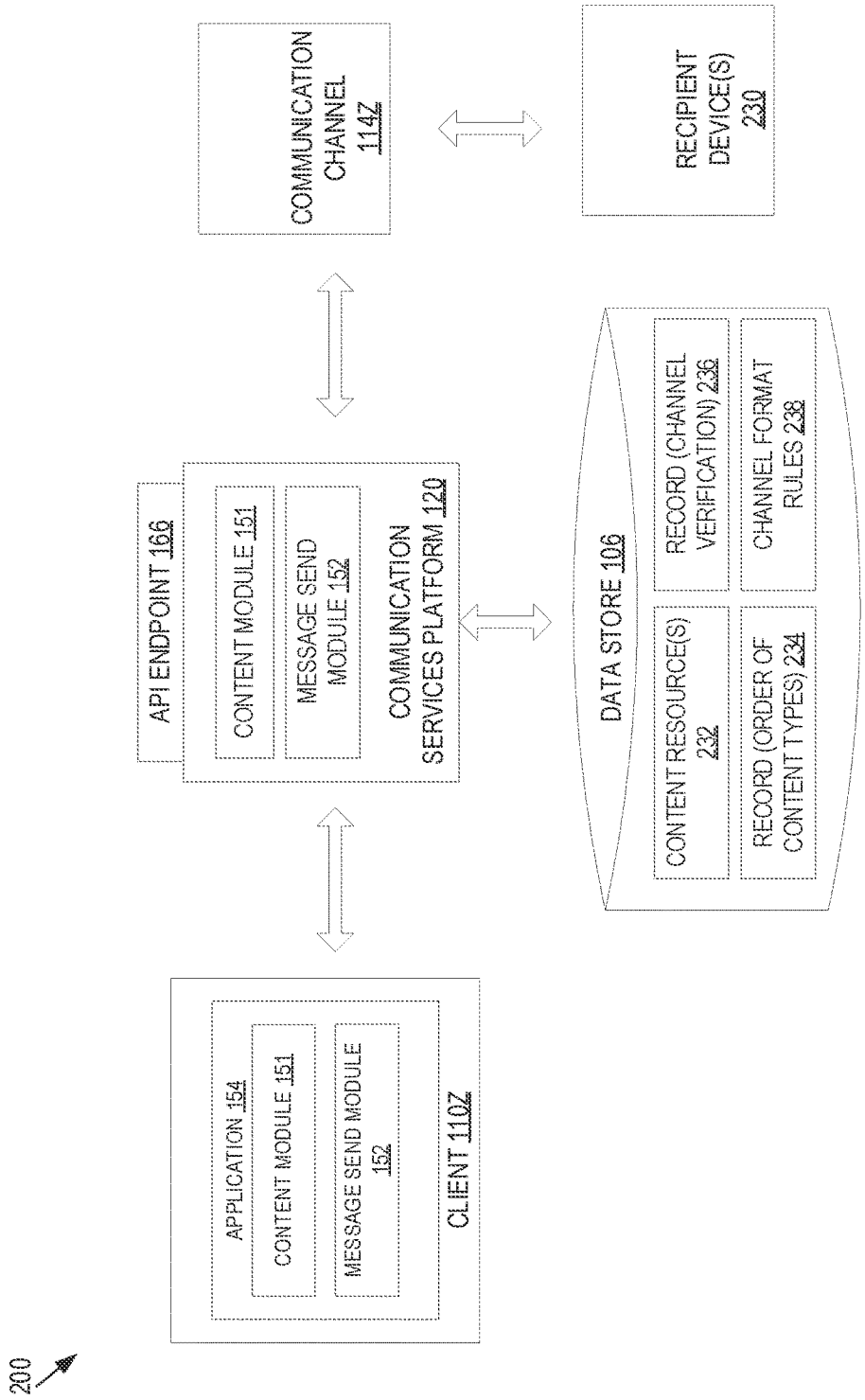
FIG. 2 illustrates an example system architecture used to create content resources and to send messages based on the content resources, in accordance with some embodiments of the disclosure.

FIG. 2 illustrates an example system architecture 200 used to create content resources and to send messages based on the content resources, in accordance with some embodiments of the disclosure. Components of FIG. 1 are used to help describe components of FIG. 2. The system architecture 200 (also referred to as "system" herein) includes a communication services platform 120, a data store 106, one or more client devices 110Z, one or more communication channels 114Z and one or more recipient devices 230. Recipient devices 230 can be similar to client devices 110A-110Z or client devices 112A-112Z as described with respect to FIG. 1.

With respect to creating one or more content resources 232 at communication services platform 120, client device 110Z (using content module 151), can send, via an API call (e.g., content resource creation API call), a request to communication services platform 120 to create a content resource, in accordance with some embodiments. In some embodiments, client device 110Z can be associated with a client account of the communication services platform 120.

In some embodiments, the request to create a content resource can specify message content for messages to be sent via one or more of the communication channels 114A-114Z of FIG. 1. In some embodiments, the request to create a content resource identifies the content resource and/or the message content specified therein in a first format. In some embodiments, the first format can correspond to a format that is compatible with the communication services platform 120. In some embodiments, the first format is translatable to one or more second formats that each correspond to one of the communication channels 114A-114Z of FIG. 1. An example of a request to create a content resource is illustrated at FIG. 3A.

As noted above, a format can refer to a format that is specific to a particular programming language, specific to a markup language, specific to a particular application, specific to a standard, or specific to another specification. For example, in some embodiments, the communication services platform 120 can implement various programming languages with specific elements defined by communication services platform 120. The specific elements can include, but are not limited to one or more of parameters, arguments, nouns, or verbs.

In an illustrative example and in accordance with some embodiments, the one or more communication channels 114A-114Z can implement communication services using specific elements described in a particular format and that may be specific to each particular communication channel. For instance, a particular instant messaging channel may define channel-specific content (e.g., parameters) or actions (e.g., verbs) using a common markup language (e.g., Extensible Markup Language (XML)). Communication services platform 120 can use other specific elements using a different format and that are specific to the communication services platform 120. A particular element (in the first format) of the communication services platform 120 can be translated to a corresponding element (in second formats) to one or more of the communication channels 114A-114Z.

In some embodiments, the communication services platform 120 can use a common format that can be translated to any of the formats corresponding to the various communication channels 114A-114Z. For example, one element of the communication services platform 120 can be translated to different elements each specific to a particular one of the communication channels 114A-114Z. For instance, the communication services platform 120 can define a particular parameter, "telephone number," in XML in a first format. The particular parameter can be translated into a corresponding parameter, "user identifier," in XML in a second format that is specific to communication channel 114Z and/or be translated into a different corresponding parameter, "address," in XML in a still different second format (e.g., third format) that is specific to communication channel 114A.

In some embodiments, the communication services platform 120 can use channel format rules 238 to translate the content resource in a first format to a second format specific to a particular channel of the communication channels 114A-114Z. The channel format rules 238 can define format rules corresponding to each of the communication channels 114A-114Z, such that the rules can be used to direct how the content resource (or elements thereof) in a first format is to be transformed to a second format particular to a respective communication channel of the communication channels 114A-114Z. In some embodiments, the channel format rules 238 can also describe any additional content or information that a particular communication channel may require or request for communication with the particular communication channel.

In some embodiments, the content resource received by communication services platform 120 via the API call is stored at the communication services platform 120. As illustrated, one or more content resources 232 can be stored at the data store 106. Each of content resources 232 can be associated with at least one client account. For example, a client account identifier can be associated with each of the content resources 232. A particular client account can have one or more associated content resources 232.

In some embodiments, subsequent to receiving the request to create a content resource, communication services platform 120 can provide client device 110Z with an identifier of the content resource stored at the communication services platform 120. In some embodiments, the identifier of the content resource can be provided to the client device 110Z using an API response. In some embodiments, the use of the identifier of the content resource helps facilitate the use of the content resource 232 as a template (e.g., content resource template) that can be used or re-used by referencing the identifier, as further described below. In some embodiments, the use of the identifier of the content resource can help facilitate the use of another API to send messages using message content defined by the content resource 232. For example, the identifier of a content resource is configured to be referenced in a subsequent API call (e.g., message send API call) used to send messages. By referencing the content resource using a subsequent message send API call (as described below) the message send API call may not include, at least in some embodiments, at least some (e.g., a majority) of the message content for a message. Instead and in accordance with some embodiments, the message send API call can reference the content resource identifier (and in some cases, values for one or more dynamic variables) such that the message content specified in the stored content resource 232 is used for a message.

In some embodiments, the request to create a content resource identifies or includes one or more of parameters (e.g., "telephone number") or arguments (e.g., "888-888-8000") (also referred to as "variables" herein) that define the message content. In some embodiments, at least one of the arguments specified in the request to create a content resource corresponds to a dynamic variable. The dynamic variable (also referred to as "placeholder variables" herein) allows a particular value or argument associated with a parameter to be defined by a subsequent API call (e.g., message send API call). As such, the inclusion of the dynamic variable(s) can help facilitate the content resource as a template and/or help to customize messages at send time. An example of dynamic variables are illustrated with respect to FIG. 3A.

In some embodiments, the request to create a content resource identifies one or more content types that may be included, at least in part, in messages sent using the message resource 232. As noted above, a content type can refer to a type of content and/or message content that is to be included in a message. In some embodiments, content types can include one or more of text type, media type, location type, button type, list-picker type, or card type. Some examples of content types are illustrated and further described with respect to FIGS. 3A and 3B.

In some embodiments, a particular channel may request that prior to a message being sent via the particular communication channel, the message content be verified by the particular communication channel. For example, the particular communication channel may request that the content of the message conform with a policy of the particular communication channel (e.g., if the communication channel prohibits explicit content or illicit products or services).

In some embodiments, client device 110Z can send an API call to request a verification (e.g., verification API call) that message content associated with a particular content resource can be sent using a particular communication channel 114Z of the communication channels 114A-114Z. The verification API request can include one or more of the client account identifier, content resource identifier, and communication channel identifier. In some embodiments, responsive to receiving the verification API request, the communication services platform 120 can use the channel format rules 238 to translate at least part of the message content (in the first format) identified in the content resource to a second format that corresponds to (e.g., is compatible with) the particular communication channel 114Z. In some embodiments, the verification request sent to the communication channel 114Z may include additional information specific to the verification request. For example, a verification request sent to the communication channel 114Z can request information such as the name that uniquely identifies the message content and/or category of the message content (as defined by the communication channel 114Z), The communication services platform 120 can further use the channel format rules 238 to determine what additional information is required by the communication channel 114Z for the verification request and include the additional information in the verification request. The verification request in the second format can be prepared by communication services platform 120 and sent to the communication channel 114Z for verification via an API call. Communication services platform 120 can monitor the status of the verification request to the communication channel 114Z. In some embodiments, a verification result can be received from the communication channel 114Z in response to the verification request. The verification result can indicate whether the message content is approved to be sent using the particular communication channel 114Z. The verification result can be stored at data store 106 as part of a record 236, such as a channel verification record. In some embodiments, the verification result can include a token, such as an authorization token. An authorization token can be a software or hardware object that is used to authorize a particular account to access and/or use a service, such as a communication service offered by a particular communication channel.

In some embodiments, communication services platform 120 can determine which of the multiple content types identified in a content resource are sent as message content in the verification request. In some embodiments, communication services platform 120 can use record 234 (e.g., record of the order of content types 234) to determine which content type to include in the verification request. In some embodiments, communication services platform 120 can send a most rich content type (e.g., as indicated by record 234) to include the verification request. An example of the order of content types record is illustrated with respect to FIG. 3E.

In some embodiments, the record of the order of content types 234 can be set or determined by communication services platform 120. In some embodiments, the client account (e.g., administrator) can create and/or edit the record of the order of content types 234. In some embodiments, communication services platform 120 receives an API call (e.g., order of content types API call) that specifies the order of content types for record 234. The order of content types specified in the order of content types API call can be stored at record 234. In some embodiments, the record 234 is associated with the particular client account and/or particular content resource 232. It can be noted that in some embodiments, the record of the order of content types 234 can also be used to determine which content object to include in a message, as further described below. The record of the order of content types 234 used for verification can be the same or different record used to determine which content type to include in a message.

As noted herein, communication services platform 120 can also implement a message send API to facilitate the sending of messages to recipient devices via the communication channels 114A-114Z. In some embodiments, communication services platform 120 can receive an API call (e.g., message send API call) from a client device associated with a client account. The message send API call can request to send a message via communication channel 114Z of the multiple communication channels 114A-114Z. In some embodiments, the message send request can include an identifier of the content resource and message content for the message can be retrieved from the corresponding content resource 232. In some embodiments, the message send request (e.g., message send API call) can include the identifier of the content resources, in lieu of including all the message content for the message. In some embodiments, the message send request can identify one or more of communication channel(s) through which the message(s) is to be sent. In some embodiments, the message send request can include a phone number associated with the recipient device 230 (or associated with the user account of the communication channel application installed thereon). In some embodiments, the message send request can include one or more value(s) of one or more dynamic variables. Examples of message send requests are illustrated with respect to FIG. 3C.

In some embodiments, responsive to receiving the message send request, communication services platform 120 can obtain the content resource 232 based on the content resource identifier. For example, the communication services platform 120 can use the content resource identifier to identify the specific content resource 232 from data store 106.

In some embodiments, communication services platform 120 can prepare the message based on the message send request and the message content identified in the content resource 232. As described herein and in accordance with some embodiments, the content resource was created by a previous content resource creation request (e.g., content resource creation API call) from client device 110Z associated with a client account of communication services platform 120.

In some embodiments, communication services platform 120 can send, via communication channel 114Z, the prepared message to the recipient device(s) 230.

In some embodiments, to prepare the message based on the message send request and the message content of the content resource 232, communication services platform 120 can translate at least part of the message content of the content resource 232. Communication services platform 120 can prepare the message in the second format that corresponds to the communication channel 114Z identified in the message send request. The message can reflect at least part of the translated message content in the second format. Examples of message send requests are provided in FIG. 3C and examples of resultant messages sent to a recipient device are provided in FIG. 3D.

In some embodiments, the content resource 232 is in a first format. For example, the format of the content resource 232 (content therein) can be in a format compatible with (and/or defined by) the communication services platform 120. In some embodiments, to prepare the message, communication services platform 120 can translate at least part of the message in the first format to a second format corresponding to the communication channel 114Z identified in the message send request. In some embodiments, translation of at least part of the content resource 232 can be facilitated by the channel format rules 238 for the particular communication channel 114Z via which the message is to be sent to the recipient device 230.

In some embodiments, the content resource 232 includes one or more dynamic variables, as illustrated with respect to FIG. 3A. It can be noted that although FIG. 3A illustrates an example of a content resource creation request, the content resource creation request includes the elements that will be used to create the content resource 232. For the sake of illustration and convenience, the content resource creation request 300 of FIG. 3A will also be referred to as a content resource herein. For example, element 310 of the content resource creation request 300 in FIG. 3A illustrates text type of content type with dynamic variable {{name}} and dynamic variable {{time}}. In some embodiments, the message send request can identify values for one or more dynamic variables. For example, element 318 of message send request 330 of FIG. 3C illustrates that the dynamic variable, "name," has a value of "Julie" and dynamic variable, "time," has a value of "4:30 PM."

In some embodiments, to prepare the message based on the message send request and the message content of the content resource 232, communication services platform 120 can identify the dynamic variable in the content resource 232. For example, the dynamic variables can be identified using a specific designation or symbol, such as double curly brackets as illustrated in FIG. 3A (e.g., element 310 or element 308). Communication services platform 120 can prepare the message in a second format corresponding to communication channel 114Z to include the value of the dynamic variable. For example, the value of "Julie" can be inserted into the body of the text content where the dynamic variable, "name" is identified by double curly brackets.

In some embodiments, content resource 232 can specify one or more content types (e.g., text type, media type, button type, etc.) that can be included in a message. In some instances and in accordance with some embodiments, a single content type is included in a message. In some embodiments, to prepare the message based on the message send request and message content of the content resource 232, communication services platform 120 can determine whether the content type specified in the content resource 232 corresponds to the communication channel 114Z. As noted herein, a particular communication channel may allow some but not all the available content types. To determine whether the content type specified in the content resource 232 corresponds to the communication channel 114Z, communication services platform 120 can use channel format rules 238 to identify which content types are available for the particular communication channel 114Z and determine whether the content type specified in the content resource 232 is a content type that is allowed by the particular communication channel 114Z as specified in the channel format rules 238.

It can be noted and illustrated in message send request 330 and 335 of FIG. 3C that the message send request may not identify the content type to be included in the message, in accordance with some embodiments. Rather, the content type to be included in the message can be specified in and/or determined based on content resource 232, the order of content types record 234, the channel format rules 238, or a combination thereof, as further described below.

In some embodiments, communication services platform 120 determines (based on the channel format rules 238) that the content type specified by the content resource 232 is allowed (e.g., supported) by the communication channel 114Z identified in the message send request. Communication services platform 120 prepares the message using the allowed content type based on the content resource 232 and the channel format rules 238, and sends the prepared message to the recipient device 230 via the communication channel 114Z.

In some embodiments, responsive to determining that the content type specified in content resource 232 does not correspond to a content type allowed by the communication channel 114Z, communication services platform 120 can select a fallback content type (e.g., alternative content type) that is allowed by the communication channel 114Z.

Figure 3E:
FIG. 3E illustrates an example of an order of content types record, in accordance with some embodiments of the disclosure.

In some embodiments, to select the fallback content type that corresponds to the communication channel 114Z and that is to be included in the message, communication services platform 120 can use record 234 that identifies the order of content types. An example of a record 234 of the order of content types is illustrated in FIG. 3E. Record 234 can indicate which alternative content type is to be included in the message when the content type specified in the content resource 232 does not correspond to the content types allowed by the communication channel 114Z. For example, record 234 can list a ranking of content types and indicate whether the content type is allowed for a particular communication channel 114Z. Communication services platform 120 can select the alternative content type based on the record 234. For example, the communication services platform 120 can select the highest ranked content type that is allowed for the particular communication channel 114Z. Communication services platform 120 can use or reformat the message content associated with the content type that is not allowed by the communication channel 114Z into message content for the content type that is allowed by the communication channel 114Z.

In some embodiments, multiple content types can be specified in the content resource 232 and communication services platform 120 can make a determination of which content type from the multiple content types specified in the content resource 232 to include in the message. In some embodiments, to determine which of the multiple content types identified in the content resource 232 is to be sent in a particular message, communication services platform 120 may identify the highest ranked content type in the record 234 that is (a) identified in the content resource 232 and is also (b) available (e.g., allowed or supported) for a particular communication channel 114Z through which the message will be sent.

For example, in some cases, not all content types are available to be sent via a particular communication channel. For instance, a particular communication channel may be configured to transmit text types, media types and button types, but not location types, list-picker types or card types of the various content types. If a text type, media type and card type are identified in the content resource 232, communication services platform 120 can choose the highest ranked of the text type and media type (identified in the content resource 232) but not the card type (not available for the particular communication channel) to send in a particular message.

In some embodiments, communication services platform 120 can select the content type (e.g., alternative content type) having the highest rank in the order of content types record 238 irrespective of the content type specified in the content resource 232. For example, if the message send request specifies a message to be sent to recipient device 230 via IM application A, and IM application A includes a text type of content type and a card type of content type, communication services platform 120 can select the highest ranked content type (e.g., card type) based on the record 238 irrespective of the content type identified in the content resource 232.

FIG. 3A illustrates an example of a request to create a content resource, in accordance with embodiments of the disclosure. The content resource creation request 300 is illustrated as a content resource creation API call, for purposes of illustration rather than limitation. As noted above, for the sake of illustration and convenience, the content resource creation request 300 will also be referred to as a content resource herein.

Element 302 illustrates an example of a parameter, "language" and an argument "en" (representing English). Element 304 represent that the particular arguments (e.g., "name") can be defined with a default value (e.g., "there") when, for example, a value for a dynamic variable, "name," is not defined in a message send API request. Element 306A illustrates a button type of content type. Element 306B illustrates the message content associated with the button type. Element 308A illustrates a text type of content type. Element 308B illustrates the message content associated with the text type.

In some embodiments, each content type is associated with different message content. For example, the element 308A (e.g., text type) defines the text to be included in the message (e.g., Hey {{name}}!We look forward to seeing you tomorrow for your appointment at {{time}}. Txt 9 to cancel, 3 to confirm.). Element 306B defines the text to be included in the message as well as the type of button (e.g., reply) and the text content of the buttons (e.g., "Cancel" and "Confirm"). It can be noted that message content associated with element 308A (button type) includes two dynamic variables (e.g., {{name}} and {{time}}). The value of the dynamic variables can be defined in the message send API request. If no value of the dynamic variable is defined in the message send API request, the value of the dynamic variable can be the default value defined in the content resource creation API request (and/or the content resource) (e.g., element 304, "there").

FIG. 3B illustrates examples of content types, in accordance with some embodiments of the disclosure. It can be noted that the content types are illustrated with respect to FIG. 3B are provided for illustration, rather than limitation. In some other embodiments, different content types can be implemented.

Content type A represents a text type. A text type can include text-based content. In some embodiment, the text-based content can include characters up to a particular number (e.g., 1,600 characters). In some embodiments, a text type can only include text-based content and not include other types of content such as multimedia content.

Content type B represents a media type. A media type can include one or more of an image, a video, a Graphics Interchange Format content (gif) or a file. A media type may have the option to include text-based content.

Content type C represents a location type. A location type can include one or more of a map and specific location designed on the map. The specific location can be designated with a location identifier, such as a pin, as illustrated. The location type may have the option to include text-based content.

Content type D represents a button type. A button type can include one or more graphical user interface (GUI) elements that are selectable by a user via a user device. An example of a selectable GUI element can include a button, as well as other selectable GUI elements. In some embodiments, the selectable GUI elements indicate a suggested response or action to be taken. The selectable GUI elements may include some text indicative of the suggested response or action. In some embodiments, the button type may have the option to include text-based content.

Content type E represents a card type. A card type can include a formatted message that includes a title (e.g., "Mother's Day with Rittenhouse Tea"). The card type may have the option to include one or more of text-based content, media, or buttons.

In some embodiments, a list-picker type (not shown) can include multiple GUI elements that are selectable by the user via a user device. In some embodiments, the multiple selectable GUI elements include a menu or list of selectable options. In some embodiments, the number of selectable options can have a maximum number (e.g., 10 options). In some embodiments, the list or menu can include a header. In some embodiments, the list can include one or more rows, where each row includes a particular selectable option. In some embodiments, the row can include a radio button to facilitate selection. In some embodiments, each row may include a title and/or additional description that provides context for the option. The options can include a text description and be separated from one another. In some embodiments, the list-picker type can have the option to include one or more of text-based content, media content or buttons.

FIG. 3C illustrates examples of message send requests, in accordance with some embodiments of the disclosure. FIG. 3D illustrates examples of messages sent via communication channels to recipient devices based on message send requests, in accordance with some embodiments of the disclosure. Message send request 330 and message send request 335 of FIG. 3C are examples of message send API calls provided for purposes of illustration rather than limitation. Message send request 330 corresponds to message A of FIG. 3D. Message send request 335 corresponds to message B of FIG. 3D.

In some embodiments, message send request 330 can include one or more elements such as elements 312, 314, 316 and 318. Element 312 represents the parameter "to" and the argument representing an identifier of the recipient device and/or the account identifier of the communication channel and/or the identifier of the communication channel. In the current example, the argument is the telephone number of the recipient device. Element 314 represents the parameter ("messagingserviceID") and the argument ("messagingserviceID"), which is the identifier of the client account. Element 316 represents the parameter ("contentSid") and the argument ("contentSid"), which represents the identifier of the content resource. Element 318 represents the parameter ("variables") and within the curly brackets are dynamic variable and value pairs (e.g., name: Julie and time: 4:30 PM).

In some embodiments, message send request 335 can include one or more elements such as elements 320, 322, 324 and 326. Element 320 is the same as element 314. Element 322 is similar to element 312 and represents the parameter "to," but the value of the parameter represents a different communication channel ("companyapp") than identified in element 312. Element 324 is the same as element 316, and element 326 is the same as element 318.

With respect to message send request 330, communication services platform 120 can translate the identified content resource (e.g., see content resource creation request at FIG. 3A) to a text message as illustrated by message A of FIG. 3D because the only content type supported by the identified communication channel (e.g., SMS channel) is text. It can be noted that the appropriate object type (i.e., text object) is selected from the identified content resource. Also illustrated in message A, the dynamic variables (e.g., {{name}} and {{time}}) have been replaced with the values ("Julie" and "4:30 PM," respectively) specified in message send request 330.

With respect to message send request 335, the same content resource and dynamic variables are specified, but a different communication channel (e.g., an IM application) has been specified. The communication services platform 120 can translate the appropriate message content of content resource into a message with a button type of content type, as illustrated in Message B. The selectable GUIs, such as "Cancel" and "Confirm," as illustrated in Message B are provided to facilitate an interactive conversational experience. It can be noted that in preparing the message, communication services platform 120 can identify among the object types specified in the content resource 232, the button type of object type as the highest ranked object type in the order of content types record that is also available for the specified communication channel (e.g., IM application).

FIG. 3E illustrates an example of an order of content types record, in accordance with some embodiments of the disclosure. Order of content types record 350 illustrates columns A through E. Column A illustrates a ranking of content types from lowest rank to highest rank. Although the rankings of content types are illustrated as the same for all communication channels, in other embodiments the rankings of content types could be different for one or more of the communication channels. Column B illustrates the content types that are allowed for channel 1 (e.g., an SMS channel). Column C illustrates the content types that are allowed for channel 2 (e.g., an MMS channel). Column D illustrates the content types that are allowed for channel 3 (e.g., an IM channel A). Column E illustrates the content types that are allowed for channel 4 (e.g., an IM channel B). As noted above, record 350, at least in part, can be user-defined in some embodiments. For example, client device 110Z can submit a request to communication services platform 120 to specify the ranking of content types as illustrated in column A. In some embodiments, the record 350, at least in part, can be defined by communication services platform 120. For example, communication services platform 120 can specify the ranking of content types.

FIGS. 4A, 4B, 4C and 5 illustrate methods 400, 430, 435 and 500 respectively. Methods 400, 430, 435 and/or 500 and/or each of the aforementioned methods' individual functions, routines, subroutines, or operations can be performed by a processing device, having one or more processing units (CPU) and memory devices communicatively coupled to the CPU(s). In some embodiments, the aforementioned methods can be performed by a single processing thread or alternatively by two or more processing threads, each thread executing one or more individual functions, routines, subroutines, or operations of the method. The aforementioned methods as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, methods 400, 430 and 435 are performed by content module 151 described in FIGS. 1 and 2. In some embodiments, method 500 is performed by message send module 152 described in FIGS. 1 and 2. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. It may be noted that elements of FIG. 1-3A-E may be used herein to help describe FIGS. 4A-4C and 5.

Figure 4A:
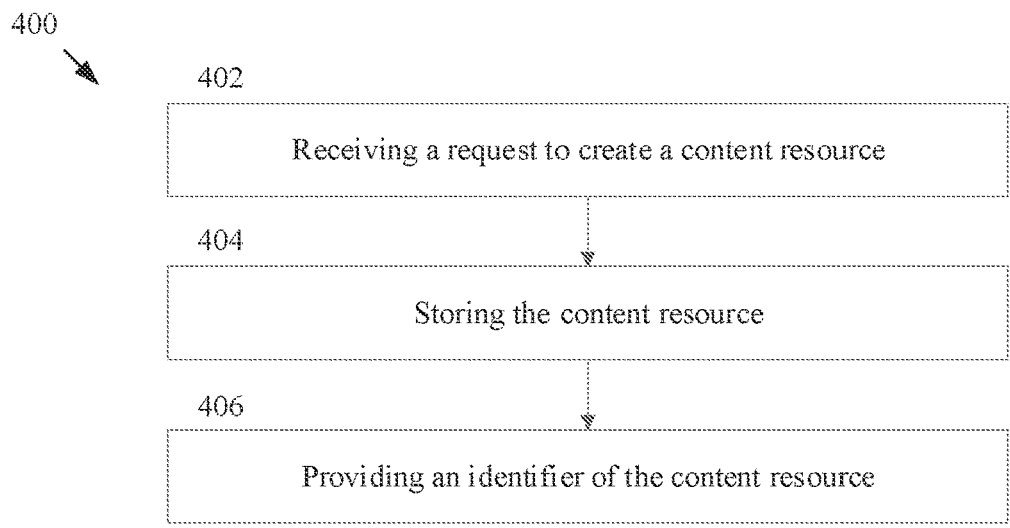
FIG. 4A depicts a flow diagram of an example method of creating a content resource at a communication services platform using a content resource creation request, in accordance with some embodiments of the disclosure.

FIG. 4A depicts a flow diagram of an example method 400 of creating a content resource at a communication services platform using a content resource creation request, in accordance with some embodiments of the disclosure.

At operation 402, processing logic receives a request to create a content resource. In some embodiments, processing logic receives, via a first application programming interface (API) call, a first request to create a content resource from a client device associated with a client account of the SaaS platform.

In some embodiments, the first request specifies message content for messages to be sent via one or more communication channels to one or more client devices of one or more recipients. In some embodiments, a client device of each recipient is different from the client device associated with the client account of the SaaS platform. In some embodiments, the first request identifies the message content in a first format. In some embodiments, the first format is translatable to multiple second formats that each correspond to one of the communication channels.

In some embodiments, the first request identifies one or more content types for the message content. In some embodiments, the one or more content types include one or more of a text type, media type, location type, button type, list-picker type, or card type.

In some embodiments, the first request identifies parameters and arguments that define the message content. In some embodiments, at least one of the arguments specified in the first request corresponds to a dynamic variable.

At operation 404, processing logic stores the content resource. In some embodiments, processing logic stores, at the SaaS platform, the content resource received via the first API call.

At operation 406, processing logic provides an identifier of the content resource. In some embodiments, processing logic provides, to the client device associated with the client account, an identifier of the content resource via a first API response. In some embodiments, the identifier of the content resource is configured to be referenced in a subsequent API call (e.g., message send API call) used to send a message via a respective one of the communication channels.

In some embodiments, the communication channels include one or more of a short messaging service (SMS) channel, a multimedia messaging service (MMS) channel, or an instant messaging service channel. In some embodiments, the communication channels exclude an electronic mail (email) channel.

FIG. 4B depicts a flow diagram of an example method 430 for verifying that message content can be sent using a particular channel associated with a communication services platform, in accordance with some embodiments of the disclosure.

At operation 408 of method 430, processing logic receives a request to verify that the message content can be sent using a communication channel of the multiple communication channels (e.g., to one or more client devices of one or more recipients that are different from the client device associated with the client account of the SaaS platform). For example, processing logic receives, via a second API call, a second request to verify that the message content can be sent using a communication channel of the multiple communication channels. In some embodiments, the communication channel is specified in the second request.

At operation 410, processing logic translates at least a part of the content resource in the first format into a second format that corresponds with the specified communication channel.

At operation 412, processing logic prepares a verification request in the second format that corresponds with the specified communication channel.

At operation 414, processing logic sends the verification request to a third-party platform associated with the specified communication channel. For example, processing logic sends, via a third API call, the verification request to a third-party platform associated with the specified communication channel.

At operation 416, processing logic provides a result of the verification indicating whether the message content is approved to be sent using the specified communication channel. For example, processing logic provides, via a second API response, a result of the verification indicating whether the message content is approved to be sent using the specified communication channel.

Figure 4C:
FIG. 4C depicts a flow diagram of an example method for defining an order of content types, in accordance with some embodiments of the disclosure.

FIG. 4C depicts a flow diagram of an example method 435 for defining an order of content types, in accordance with some embodiments of the disclosure.

At operation 418 of method 435, processing logic receives a request to define an order of content types. In some embodiments, processing logic receives, via a fourth API call, a request to define an order of content types that identify which other content type should be included in the messages to be sent when the one or more content types of the message content of the content resource are not available for a communication channel of the multiple communication channels.

At operation 420, processing logic associates the order of content types with the client account.

FIG. 5 depicts a flow diagram of an example method 500 for sending messages using a software (SaaS) platform and via multiple communication channels, in accordance with some embodiments of the disclosure.

At operation 502 of method 500, processing logic receives a request to send a message via a communication channel of multiple communication channels (e.g., to one or more client devices of one or more recipients that are different from a client device associated with a client account of the SaaS platform). In some embodiments, processing logic receives, via a first application programming interface (API) call, a first request to send a message via a communication channel of the multiple communication channels. In some embodiments, the first request is received from the client device associated with the client account.

In some embodiments, the first request includes an identifier of a content resource specifying message content for the message. In some embodiments, the first request identifies one or more of the communication channels and a phone number associated with the recipient device.

At operation 504, processing logic obtains the content resource based on the identifier. In some embodiments, the content resource was created using a previous API call from the client device of the client account.

At operation 506, processing logic prepares the message based on the request and the content resource.

In some embodiments, the content resource is in a first format. In some embodiments, preparing the message based on the first request and the content resource includes translating at least part of the content resource in the first format to a second format corresponding to the communication channel, and preparing the message in the second format that corresponds to the communication channel. In some embodiments, the message reflects at least part of the translated message content in the second format.

In some embodiments, the content resource includes a dynamic variable and the first request identifies a value for the dynamic variable. In some embodiments, preparing the message based on the first request and the content resource includes identifying the dynamic variable in the content resource, and preparing the message in the second format to include the value of the dynamic variable.

In some embodiments, the content resource specifies a content type. In some embodiments, preparing the message based on the first request and the content resource includes determining whether the content type specified in the content resource corresponds to the communication channel, and responsive to determining that the content type specified in content resource does not correspond to the communication channel, selecting an alternative content type (e.g., fall back content type) that corresponds to the communication channel and that is to be included in the message. In some embodiments, responsive to determining that the content type specified in the content resource does correspond to the communication channel, processing logic selects the content type specified in the content resource and prepares a message with the specified content type.

In some embodiments, selecting the alternative content type that corresponds to the communication channel and that is to be included in the message includes identifying a record defining an order of content types that indicates the alternative content type to be include when the content type specified in the content resource does not correspond to the communication channel, and selecting the alternative content type based on the record. In some embodiments, the order of content types of the record is user configurable.

At operation 508, processing logic sends, via the communication channel, the prepared message to one or more client devices of one or more recipients.

Figure 6:
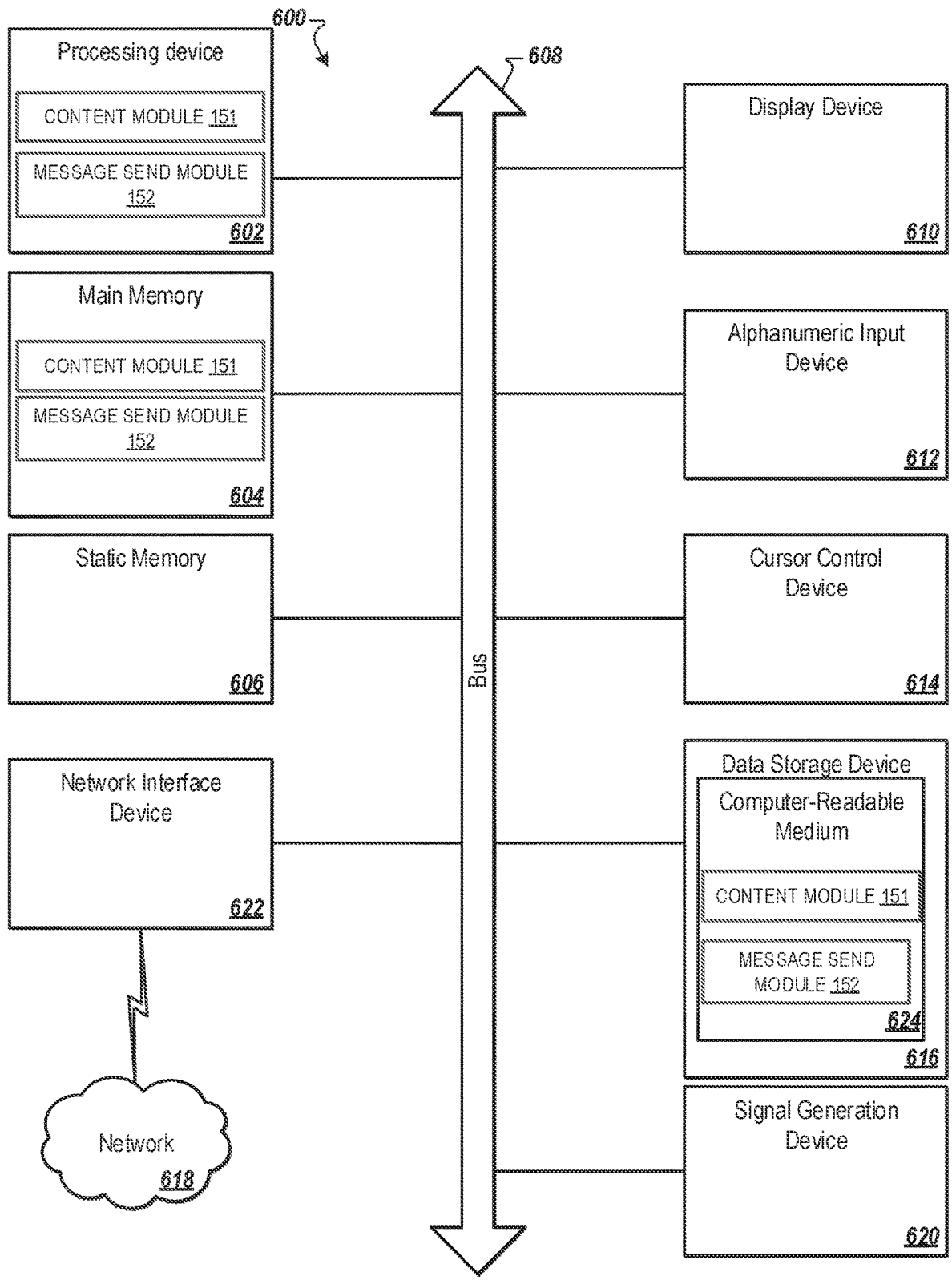
FIG. 6 is a block diagram illustrating an exemplary computer system, in accordance with some embodiments of the disclosure.

FIG. 6 is a block diagram illustrating an exemplary computer system 600, in accordance with an embodiment of the disclosure. The computer system 600 executes one or more sets of instructions that cause the machine to perform any one or more of the methodologies discussed herein. Set of instructions, instructions, and the like may refer to instructions that, when executed by computer system 600, cause computer system 600 to perform one or more operations of content module 151 and/or message send module 152. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 616, which communicate with each other via a bus 608.

The processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions of the system architecture 100 and content module 151 and/or message send module 152 for performing the operations discussed herein.

The computer system 600 may further include a network interface device 622 that provides communication with other machines over a network 618, such as a local area network (LAN), an intranet, an extranet, or the Internet. The computer system 600 also may include a display device 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a non-transitory computer-readable storage medium 624 on which is stored the sets of instructions of the system architecture 100 of content module 151 and/or message send module 152 embodying any one or more of the methodologies or functions described herein. The sets of instructions of the system architecture 100 and of content module 151 and/or message send module 152 may also reside, completely or at least partially, within the main memory 604 and/or within the processing device 602 during execution thereof by the computer system 600, the main memory 604 and the processing device 602 also constituting computer-readable storage media. The sets of instructions may further be transmitted or received over the network 618 via the network interface device 622.

While the example of the computer-readable storage medium 624 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that causes the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method, comprising:
receiving, via a first application programming interface (API) call, a first request to create a content template for messages to be sent via a plurality of communications channels via a software-as-a-service (SaaS) platform, wherein:
the first request specifies an order of content types identifying a first content type and at least one alternative content type that is to be included in a message sent to a communication channel among the plurality of communication channels if the first content type is not permitted by the communication channel;
creating the content template that is associated with the order of content types; and
storing, by a processing device at the SaaS platform, the content template.

2. The method of claim 1, wherein a content type identifies a type of content that is to be included in the message.

3. The method of claim 1, wherein the first request further specifies elements of the content template in a first format, wherein the first format is translatable to channel specific formats corresponding to the plurality of communication channels.

4. The method of claim 1, further comprising:
providing, to a client device associated with a client account of the SaaS platform, an identifier of the content template via a first API response.

5. The method of claim 3, further comprising:
receiving, via a second API call, a second request to verify whether message content specified by the content template is approved to be sent using a first communication channel of the plurality of communication channels; and
providing, via a second API response, a result of a verification indicating whether the message content is approved to be sent using the first communication channel.

6. The method of claim 5, further comprising:
translating at least a part of the content template in the first format into a first channel-specific format corresponding to the first communication channel;
preparing a verification request in the first channel-specific format; and
sending, via a third API call, the verification request to a third-party platform associated with the first communication channel.

7. The method of claim 1, wherein the first request specifies one or more content types for message content.

8. The method of claim 7, wherein the one or more content types comprise one or more of text type, media type, location type, button type, list-picker type, or card type.

9. The method of claim 7, further comprising:
associating the order of content types with a client account of the SaaS platform.

10. The method of claim 4, wherein the identifier of the content template is configured to be referenced in a subsequent API call used to send the message via a respective one of the plurality of communication channels.

11. The method of claim 1, wherein the plurality of communication channels comprise one or more of a short messaging service (SMS) channel, a multimedia messaging service (MMS) channel, or an instant messaging service channel.

12. The method of claim 1, wherein the first request specifies parameters and arguments that define message content, and wherein at least one of the arguments specified in the first request corresponds to a dynamic variable.

13. The method of claim 1, wherein the plurality of communication channels exclude an electronic mail (email) channel.

14. A system comprising:
a memory; and
a processing device, coupled to the memory, to perform operations comprising:
receiving, via a first application programming interface (API) call, a first request to create a content template for messages to be sent via a plurality of communications channels via a software-as-a-service (SaaS) platform, wherein:
the first request specifies an order of content types identifying a first content type and at least one alternative content type that is to be included in a message sent to a communication channel among the plurality of communication channels if the first content type is not permitted by the communication channel;
creating the content template that is associated with the order of content types; and
storing, by the processing device at the SaaS platform, the content template.

15. The system of claim 14, wherein a content type identifies a type of content that is to be included in the message.

16. The system of claim 14, wherein the first request further specifies elements of the content template in a first format, wherein the first format is translatable to channel specific formats corresponding to the plurality of communication channels.

17. The system of claim 14, the operations further comprising:
providing, to a client device associated with a client account of the SaaS platform, an identifier of the content template via a first API response.

18. The system of claim 16, the operations further comprising:
receiving, via a second API call, a second request to verify whether message content specified by the content template is approved to be sent using a first communication channel of the plurality of communication channels; and providing, via a second API response, a result of a verification indicating whether the message content is approved to be sent using the first communication channel.

19. A non-transitory computer-readable medium comprising instructions that, responsive to execution by a processing device, cause the processing device to perform operations comprising:

receiving, via a first application programming interface (API) call, a first request to create a content template for messages to be sent via a plurality of communications channels via a software-as-a-service (SaaS) platform, wherein:

the first request specifies an order of content types identifying a first content type and at least one alternative content type that is to be included in a message sent to a communication channel among the plurality of communication channels if the first content type is not permitted by the communication channel;

creating the content template that is associated with the order of content types; and storing, by the processing device at the SaaS platform, the content template.

20. The non-transitory computer-readable medium of claim 19, wherein a content type identifies a type of content that is to be included in the message.

* * * * *